United States Patent [19]

Reed

[11] Patent Number: 5,266,772
[45] Date of Patent: Nov. 30, 1993

[54] FLEXIBLE PORTABLE CONTAINER FOR CARRYING AND MAINTAINING ARC WELDING ELECTRODES AT USE TEMPERATURE AND METHOD FOR MAINTAINING ARC WELDING ELECTRODES AT USE TEMPERATURE

[75] Inventor: Thomas M. Reed, Trenton, N.J.
[73] Assignee: Thermal Tech, Inc., Trenton, N.J.
[21] Appl. No.: 791,311
[22] Filed: Nov. 14, 1991
[51] Int. Cl.⁵ ............................................. B23K 9/26
[52] U.S. Cl. ................................ 219/137 R; 150/161; 219/136; 219/138
[58] Field of Search ................... 219/136, 137 R, 138; 150/161, 901; 126/226, 263; 224/904

[56] References Cited

U.S. PATENT DOCUMENTS

| | | | |
|---|---|---|---|
| 1,895,074 | 1/1933 | Hagerstrom | 224/904 |
| 2,758,798 | 8/1956 | Schmidt | 224/904 |
| 3,976,049 | 8/1976 | Yamashita et al. | 126/263 |
| 4,660,610 | 4/1987 | McIntire, III | 150/161 |

FOREIGN PATENT DOCUMENTS 1039666 9/1958 Fed. Rep. of Germany ...... 219/136

Primary Examiner—Clifford C. Shaw
Attorney, Agent, or Firm—Abdallah & Muckelroy

[57] ABSTRACT

A combination of a layered leather pouch and a flat flexible unified structure of a heater utilizing an exothermic composition for the purpose of creating and maintaining an arc welding rod inside the pouch at a temperature range between about 28 degrees C and about 139 degrees C, the pouch having a walled off compartment made of specifically perforated suede, the compartment being adapted to receive and hold one or more heaters having sufficient heat generating capacity to maintain the rod in the temperature range for an extended period of at least 3 hours and to be portably and safely worn adjacent a welder on his belt.

5 Claims, 4 Drawing Sheets

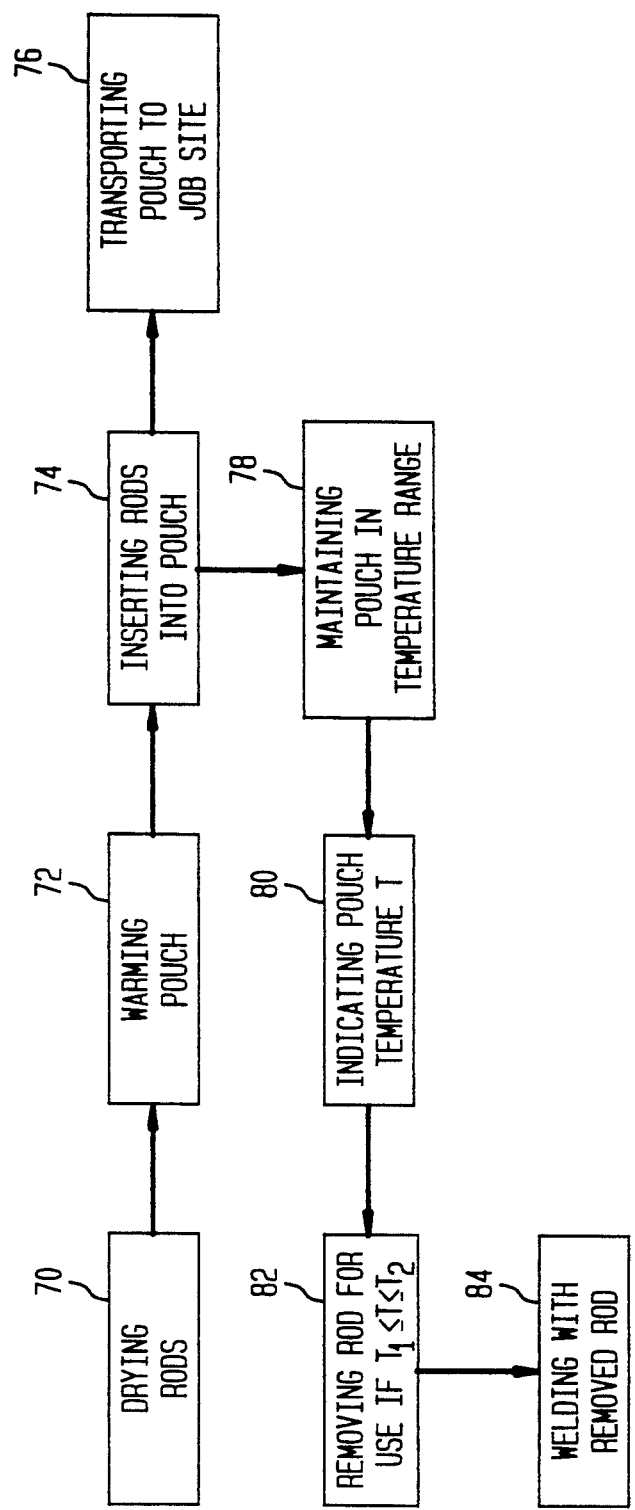

FLEXIBLE PORTABLE CONTAINER FOR CARRYING AND MAINTAINING ARC WELDING ELECTRODES AT USE TEMPERATURE AND METHOD FOR MAINTAINING ARC WELDING ELECTRODES AT USE TEMPERATURE

BACKGROUND OF THE INVENTION

1. Field of the Invention

The present invention relates, in general, to electrical arc welding, electric arc welding electrodes, and condition of an arc welding electrode prior to using the electrode to weld two pieces of metal together.

2. Description of the Prior Art

It is well known in the arc welding art that prior to welding steel, for example, the electrodes used must be conditioned properly to avoid adverse defects in the welds. Common defects in welds include undercutting, improper tie ends, porosity, lack of fusion, and either over or under fillet size. One of the ways utilized to provide low hydrogen electrodes for adverse welding conditions requiring low hydrogen deposits is to double coat using a titania coating to assist in protecting the underlying low hydrogen coating with a view to reducing or eliminating porosity problems.

Specifically, hydrogen can adversely affect a weld and some steels under certain conditions. One source of this hydrogen is moisture in the electrode covering. For this reason proper storage, treatment and handling of electrodes is absolutely necessary to prevent a defective weld. This is especially important in the construction and erection of multiple story buildings which rely for their support and inner structure on welded steel beams. A defective weld can result in the collapse of a portion of a building or during subsequent inspection rejection of the weld. This requires rebuilding a portion of the metal inner structure of a skyscraper or other building sometimes at cost overruns of many millions of dollars.

Electrodes are manufactured to be within acceptable moisture limits consistent with the type of covering and strength of the weld metal to be used with the electrode. They are then packaged in a container which has been designed to provide the degree of moisture protection considered necessary by the industry for the type of covering involved. Electrodes can be maintained for many months under proper storage at normal room temperatures with relative humidity at 50% or less or in holding ovens. A main problem with these holding ovens is that on a particular construction site for example a multiple story skyscraper building, the holding ovens are usually not readily accessible to various welding sites as the structure is being erected. The welder usually removes from the holding ovens one or more electrodes needed for a welding job and carries them to a particular subsite.

In the past leather pouches have been used in combination with heavy leather gloves worn by the welder to remove the electrode from the holding oven for insertion into a pouch carried on a belt by the welder. However, in extremely cold climates such as the northeastern United States, Europe, Greenland and Canada in winter these electrodes rapidly lose heat and decrease to an unacceptable temperature prior to being engaged to make a weld. Moreover, after these electrodes are removed from the holding oven and placed in the pouch and lose temperature on some occasions their coverings absorb excessive atmospheric moisture. When this happens and the electrode is used a defective weld with hydrogen bubbles therein is created which adversely affects the strength and integrity of any subsequent weld. In most instances when these welds are inspected they are marked and checked for reworking, removal, and rewelding.

In the prior art if a welder detected that an electrode picked up excessive moisture use of the electrode was postponed until it is restored to a usable condition by replacement in the holding oven or in a drying oven. For example, a low hydrogen iron powder welding electrode of the E7048 American Welding Society (AWS) classification requires drying for 2 hours at a temperature of 245 degrees C plus or minus 15 degrees C. The recommendation or standard for storing the electrode in the holding oven is 28 degrees C to about 130 degrees C above ambient temperature.

The low hydrogen (classifications E7015 and E7016) and low hydrogen iron powder (classification E7018, E7028 and E7048) electrodes are the most critical types for moisture absorption. These electrodes are manufactured to contain less than 0.6% of moisture in their coverings and are required according to presently acceptable welding standards and procedures for building to be handled with considerable care. In particular they are required to be maintained at an ambient temperature of 30 degrees C plus or minus 10 degrees C and at 50% maximum relative humidity.

On the other hand, coverings for the classification E6010 and E6011 electrodes have different maintenance requirements and are not within the subject matter of this application. These electrodes are required to have moisture levels of from 3 to 7 percent. They are stored at ambient temperature and holding ovens and drying are not recommended prior to their use. These types of electrodes are adversely affected by drying and will cause improper welds if they are subject to drying in an oven or holding at a temperature above ambient.

Porosity is a welding term of art and is a weld defect caused by air bubbles trapped in a weld during the welding process. These bubbles are often caused by using a low hydrogen welding rod (e.g. classification E7018) which has not been kept warm or has cooled down too much prior to being utilized in the welding process. This allows water vapor to enter the well and subsequently during the welding process creates a weal weld of lesser strength than one wherein water vapor has not been allowed to permeate the welding electrode or rod.

It is very important while welding two pieces of metal together with low hydrogen rods to keep the welding electrode or rod within a temperature range between about 30 degrees C and about 150 degrees C. This temperature range has been determined by the industry to be adequate to prevent water vapor from adhering to and permeating the rod and subsequently entering the weld during the welding process. When a weld is not properly executed due to the use of a improperly maintained rod or electrode which has cooled off even partially the coast of repairing such a weld in a building erection environment is often considerable. If the weld is not detected during the initial construction process before the concrete, brick or mortar skin is erected for the particular floor the restructuring process may cost tens of thousands of dollars. If it is caught prior to this time the repair cost may amount to a few hundred or a few thousand dollars.

If a defective weld due to moisture and porosity is detected the entire weld must be removed. The metal parts must then be fitted to each other again and the entire welding process must be executed in its entirely with new electrodes. The bad weld must be ground out. Specifically the bad weld must be removed with a grinder having a hardness greater than that of the two metals joined and of the weld. Alternately, an instrument called an arc gouge may be utilized. Ar arc gouge involves the use of a lead rod with compressed air to cut the bad weld material out with a high temperature torch. Subsequently, a fitter tacks the two ends of the respective metal pieces together and after this procedure is completed the welder must perform the entire welding process again.

For example, welders in the New Jersey area are paid approximately $23.00 per hour and a fitter approximately the same amount. To redo a simple weld not including the time to go up to the site in the case of a multiple story building takes approximately 4 hours for both the fitter and the welder. This means a total cost of 8 hours not including time up the building or time down the building times $23.00 for a cost of approximately $184.00. Even worse when dealing with large diameter pipes repairing and refitting a defective weld might taken any where from a day to a week resulting in a repair cost of approximately $5,000.00. Not only does the cost of replacing a weld have to be considered, if it is a critical weld and a critical aspect of the structure refitting the weld can result in job delays, contract problems and cost overruns involving hundreds of thousands of dollars.

As early as 1886 the concept of utilizing an independent heater or heating element for maintaining a space at a particular temperature was applied in developing a heater for beds, for example in U.S. Pat. No. 354,764 issued to Bell. In 1888 Hiller was issued U.S. Pat. No. 381,549 for a heater for muffs. Hiller's invention is described as a class of minature stoves or warmers employed about the person to emit or throw off heat without burning the parts they may come into contact with. One construction employed a square rectangular box of metal with flat sides and ends perforated with holes. Over the box was placed a layer of fibrous material of cloth. The superimposed layer of cloth was made to hug the outer surface of the metal box as closely as possible so that the heat could pass from the interior of the box directly through the perforations. The heat would otherwise be stored within the box as long as possible with the perforations providing the necessary means for draft of the heated air from the box.

In 1928 France issued Patent No. 638,378 for an insulated elongated receptacle means capable of holding and retaining the temperature of a rod inserted into an inner cavity.

In 1892 Potts was issued U.S. Pat. No. 468,946 for an appliance made of a number of small segments of a material capable of being heated and holding heat and enveloped in a cover used to prevent it from burning the skin.

In 1897 Belgium patent No. 21,548 was issued to Eloy for an apparatus employing as a source of heat a highly needed metal bar placed in a sheet having double sides filled with a material adapted to absorb and slowly emit heat given off by the bar to heat carriages and railway cars.

In 1976 U.S. Pat. No. 3,976,049 was issued to Yamashita et al. for a chemical warmer comprising a pouch adapted to accommodate an exothermic composition whereby heat is produced from the oxidation of iron powder for the purpose of creating and keeping an item warm at a particular temperature. Yamashita demonstrates a heat generating capacity of 49 to 56 degrees C over an ambient of 13 to 17 degrees C for a period of up to 15 hours. The device patented by Yamishita is manufactured by Mycoal Warmers Company, Ltd. of Japan under the trade name GRABBER as a hand a pocket warmer. The GRABBER provides a temperature in a pocket or glove of between 57 degrees C to 69 degrees C for approximately 7 hours or more.

OBJECTS OF THE INVENTION

It is thus an object of the present invention to provide an apparatus and method for eliminating weld defects caused by air bubbles trapped in welds using low hydrogen electrodes during the welding process.

It is thus another object of the present invention to provide an apparatus and method for eliminating weld defects caused by moisture in the welding electrodes during the welding process.

It is yet another object of the novel invention to provide a means for keeping welding rods at the proper holding temperature outside conventional holding ovens.

It is thus a primary object of this invention to provide an apparatus and system wherein water vapor is prevented from entering a weld electrode.

And, it is a principal object of the invention to provide a method and apparatus for providing greater assurance of the strength and structural integrity of a weld made using a low hydrogen welding rod.

It is thus another object of the novel invention to provide an apparatus which not only keeps a low hydrogen welding rod in a temperature range of approximately 30 to 150 degrees C portably while being carried by a welder but also provides a indicator which indicates the approximate temperature inside a personal carrying and transporting apparatus.

It is yet another object of the invention to provide a vehicle for carrying arc welding rods which must be maintained at a temperature above ambient for a period of time before use as well as for maintaining these rods at a required temperature for an extended period of time in a durable yet portably comfortable flexible container having a non-electrical self generating heating system contained therein which is easily replaceable, replenishable and disposable.

It is also an additional object of the present invention to provide a carrier vehicle which has a display apparatus attached to the vehicle capable of indicating the temperature of the vehicle and which provides a temperature readout by non-electrical means and which provides greater durability over thermometry means utilizing glass thermometers and electrical readout thermocouple systems.

It is still yet another object of the novel invention to provide an inexpensive yet durable temperature readout means for a portable carrier pouch having a self-contained heating system which is flexible and capable of being easily worn about a welder's waist or boot.

It is also yet another object of the novel invention to provide a carrying vehicle which may be carried by a welder for a period of several hours and which maintains low hydrogen arc welding electrodes at a temperature of between about 30 degrees to about 150 degrees C above ambient using heat generated by a plurality of chemical packets of a single large packet specifically designed and shaped to fit within the inner walls of a specially adapted leather pouch.

SUMMARY OF THE INVENTION

The present invention is a container and a method for maintaining covered welding electrodes within a temperature range of between about 28 degrees C and about 139 degrees C above ambient temperature which in combination with a drying and holding oven utilizes a pouch having multiple walls with the pouch being closably openable at the side thereof, open at the top thereof and having an outer wall and an inner wall with an inner storage plenum for welding rods and an outer cavity in between the outer and the inner wall. The outer cavity is adapted to receive a flexible self-contained warmer capable of generating sufficient heat to maintain the inner plenum within a holding temperature range of between about 28 degrees C and 139 degrees C for a period of several hours. The container is adapted to be hung either on a belt or a boot of a welder and comfortably transported and held there while the welder is engaged in a welding operation. The pouch is preferably made of suede leather for its flexibility, durability and its capacity for insulating the body of the welder from the heat generated by the chemical from an exothermic composition in the flexible warmer contained in the cavity between the inner wall and the other wall of the container.

BRIEF DESCRIPTION OF THE DRAWINGS

FIG. 7 is a block diagram showing the novel method according to the present invention.

DETAILED DESCRIPTION OF THE PREFERRED EMBODIMENT OF THE INVENTION

Figure 1:
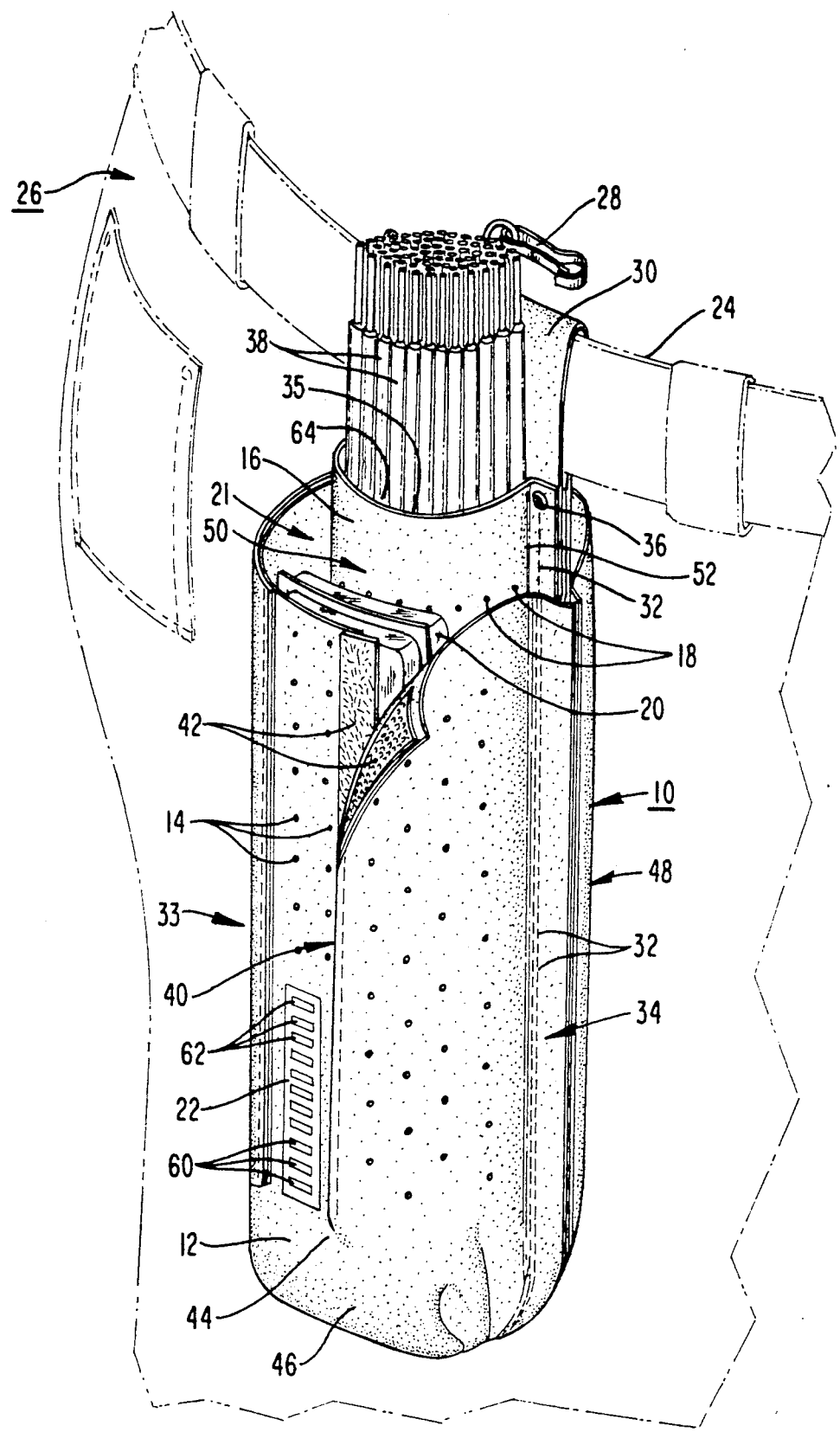
FIG. 1 is a perspective view of the novel container of the present invention.

While the novel invention is susceptible to embodiment in many different forms there is shown in the drawings hereinafter described in detailed a specific embodiment of the invention with the understanding that the present disclosure is to be considered an exemplification of the principles of the invention as presently used. This description is not intended to limit the invention to the embodiment illustrated.

A novel container 10 is shown in FIGS. 1 through 6.

The novel container 10 is flexible and portable. The container 10 is adapted for carrying and maintaining a plurality of arc welding rods 38 at a preheated temperature as shown in FIG. 1. The container 10 is made up of an outer receptacle 12 and an inner receptacle 16. The outer receptacle 12 has secondary perforations 14 therein. The inner receptacle 16 has primary perforations 18 therein. Located in between the outer receptacle 12 and the inner receptacle 16 is at least one heating packet 20, for example, a triple sized GRABBER located in a plenum 21. The outer receptacle 12 is adapted with a means for providing an indication of the temperature T inside the container 10, for example, a thermometer 22 of the liquid crystal type, for example. The thermometer 22 is attached to the outside of the outer receptacle 12 at a distal side 46. The thermometer 22 is adapted to provide a readout of the temperature reading at the surface of the outer receptacle 12 which is calibrated to indicate the temperature T inside the inner receptacle 16. Alternatively or additively, a thermometer is placed inside the inner receptacle 16 and partially covered by a small leather covering, for example, to prevent damage and removed periodically for reading. The container 10 is shown attached to a belt 24 of a welder 26. The container 10 has a clip 28 attached to a loop 30. Although the loop 30 is shown attaching the container 10 to the belt 24 of the welder 26, alternatively the clip 28 may be used for this purpose.

Stitches 32 linear and substantially parallel to the longitudinal axis of the welder 26 simultaneously close both the outer receptacle 12 and the inner receptacle 16 at the left and right sides of container 10. The stitches 32 are located at the ventral side 34 of the container 10. The stitches 32 extend linearly along a dorsal side 33 (see FIGS. 3 and 4) and a ventral side 34 through both the outer receptacle 12 and the inner receptacle 16. The top edge 35 of the inner receptacle 16 at the ventral side thereof is closed with a rivet 36. The rivet 36 provides the best durability to the inner receptacle 16 and prevents ripping during insertion and removal of the arc welding rods 38.

The outer receptacle 12 is adapted with a seam 40. The seam 40 is adapted with a means for providing reclosability, namely fastening means 42 of the hook and loop type for example. The seam 40 extends the entire length of the outer receptacle 12 and ends at a point 44 near the bottom of the container 10.

Figure 4:
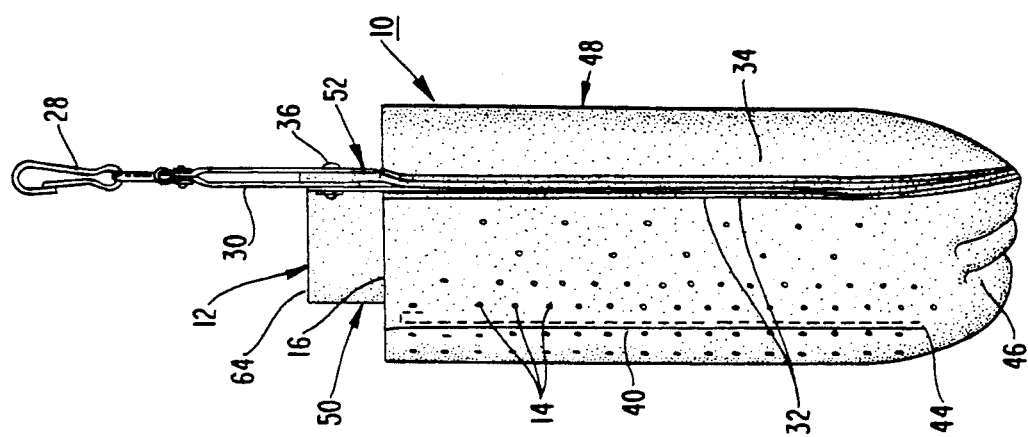
FIG. 4 is a right side view of the novel container as shown in FIG. 1.
Figure 3:
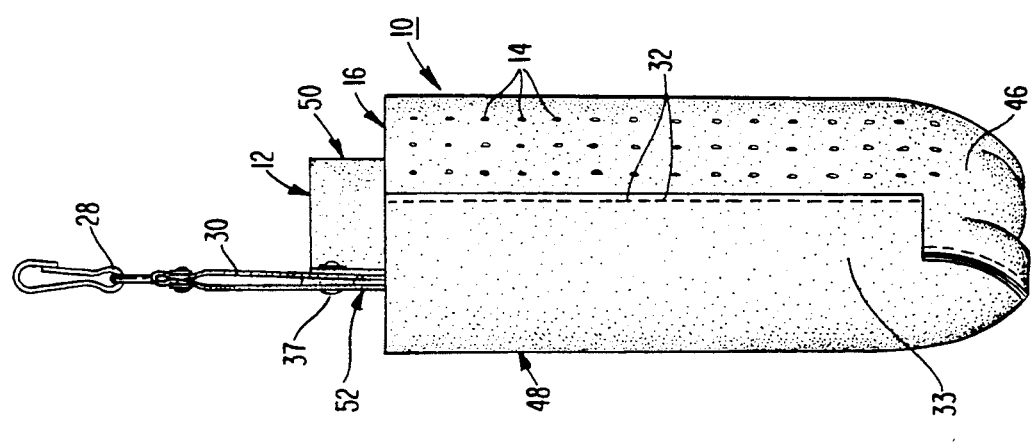
FIG. 3 is a left side view of the novel container of the invention as shown in FIG. 1.

Referring the FIGS. 3 and 4, the distal side 46 of the outer receptacle 12 has the secondary perforations 14 therein and a proximal side 48 without any perforations therein. This arrangement is critical to the portability and wearability of the container 10. The secondary perforations 14 are arranged in a pattern with a specific density on the distal side 46 of the outer receptacle 12. The primary perforations 18 are arranged on both a primary distal side 50 of the inner receptacle 16 and a primary proximal side 52.

Figure 6:
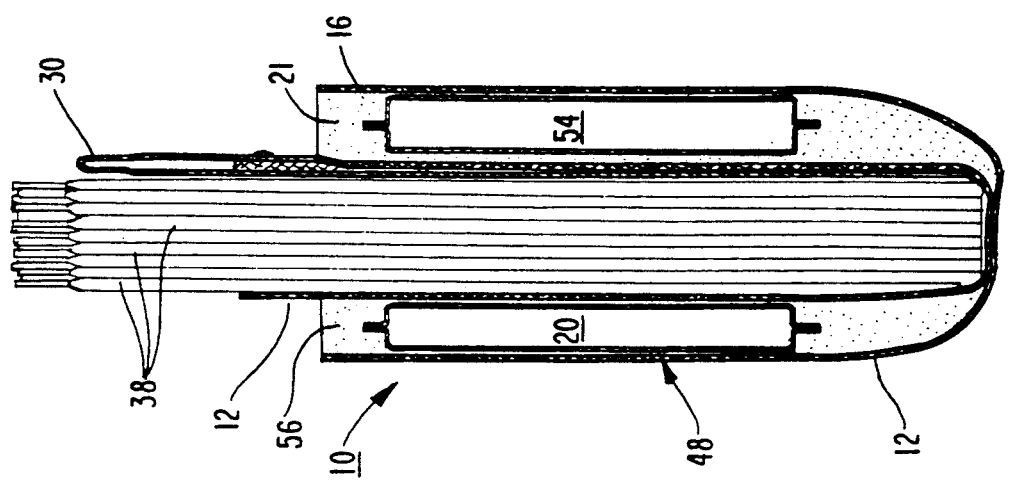
FIG. 6 is a cross section of the container shown in FIG. 2 filled with arc welding rods and taken along the line 6—6' illustrated in FIG. 2.
Figure 5:
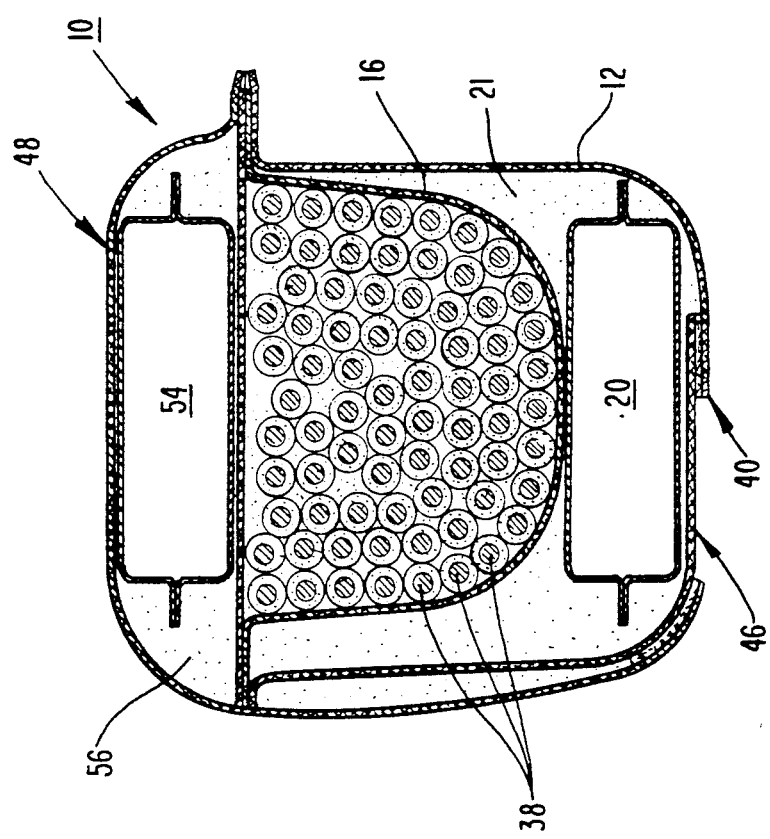
FIG. 5 is a cross section of the novel container shown in FIG. 2 taken along the line 5—5'.

As shown in FIGS. 5 and 6, in addition to the heating packet 20 shown in FIG. 1 there is shown a second heating packet 54 in a plenum 56 in between the inner receptacle 16 and the outer receptacle 12. In addition, if necessary to maintain the temperature inside the inner receptacle 16 within the range from about 28 degrees C to about 139 degrees C additional heating packets 20 or 54 may be inserted in the plenum 21 and/or the plenum 56.

The thermometer 22 is either sewned, riveted, or epoxied to the outer receptacle 12. However, epoxing is preferred. The primary perforations 18 should not be spaced further than ¼ inch apart. The diameter of these perforations should be between about 1/16 and about 1/32 of an inch. The purpose of the primary perforations 18 is to allow convective passage of heat from the heating packets 20 and 54 into the inner receptacle 16. This convective transfer of heat from the heating packet 54 along with the temperature or heating gradient from the heating packet 20 through the surface of the inner receptacle 16 to the rods 38 heats and warms the coated portions of the rods 3 and maintains them within the required temperature range from about 28 to 138 degrees C.

Figure 2:
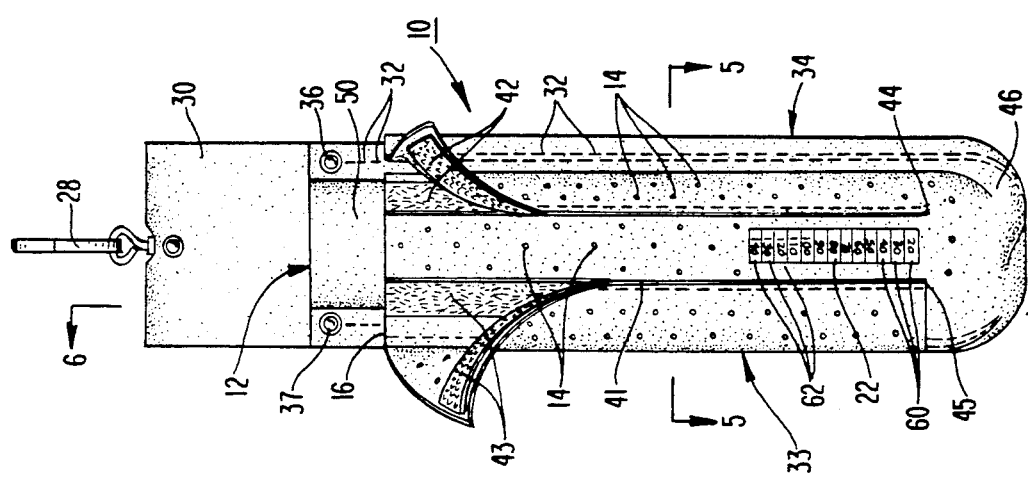
FIG. 2 is a front view of the novel container shown in FIG. 1.

As shown in FIGS. 2, 5 and 6 the absence of any perforations on the proximal side 48 of the outer receptacle 12 established a heat flow vector away from the welder 26. This functional arrangement combined with the insulating effect of air pockets trapped in the suede leather utilized for the container 10 protects the welder 26. The suede leather should be at least 100 mils thick. The primary perforations should have a density of 8 per square inch. The secondary perforation should have a density of 10 per square inch, and an aperture diameter of at least 1/16 inches for both primary and secondary perforations. A volume of about 500 cubic centemeters for the container 10 is preferred along with a length of about 14 to 16 inches from the bottom up to the rivet 36.

The combined heat output of the packets 20 and 54 each consisting of 43 GRABBER MINI-MINI TM heaters, inserted between the outer wall 12 and inner wall 16 provides sufficient heat flow to maintain 12 E7018 rods between 28 degrees C and 150 degrees C above an ambient of 10 degrees C for at lest 4 hours at a withdrawal rate of two rods per half hour.

The outer receptacle 12 is alternatively made of a plurality of layers of suede leather such as pigskin, for example. The inner receptacle 16 may be made up of a plurality of standard grades of suede leather, for example, pigskin. It is unnecessary for the various layers to be bonded together but the perforations 18 should be aligned to provide a clear passage for heated air from the plenum 2 established inbetween the inner receptacle 16 and the outer receptacle 12 into the inside of the inner receptacle 16.

The thermometer 22 attached to the outer receptacle 12 is comprised of a number of color dots, for example, the color dots 60 and the color dots 62. Each of the color dots therein has a number, for example, the lower most color dot among the dots 60 has illustrated therein the number 10, the next dot has the number 20, and the third dot the number 30. The color dots from the lower group 60 to the upper group 62 may consist of a total of 14 dots, the numbers in sequence ranging from 10 to 140. These 10 color dots are calibrated to reflect temperature over a range from 10 to 140 degrees C. This is the temperature range specified and recommended by the AWS holding ovens containing the arc welding electrodes which are the subject of this application.

In use the container 10 is loaded with a plurality of arc welding rods 38 which have been prewarmed in a holding oven to a temperature of between 28 degrees C to about 139 degrees C.

The heating packets 20 and 54 are an adaptation of the warmer structure identified in U.S. Pat. No. 3,976,049 issued on Aug. 24, 1976, to Yamishita el al. The heaters 20 and 54 are adapted to provide a temperature inside the inner receptacle 12 of between 28 degrees C and 140 degrees C for a period of several hours, for example, four hours. It has been specifically determined that a heater packet 20 substantially similar to three of the heater packets marked under the trademark GRABBER and manufactured by Mycoal Warmer Company Limited of Japan are sufficient to maintain the inner receptacle 12 containing twelve E7018 rods therein prewarmed to a temperature of 140 degrees C at a temperature of between 28 and 140 degrees C for a period of at least three hours. The inner pouch has a length of approximately 12 inches and a top opening with a diameter of approximately two and three quarter inches. The outer receptacle 12 is adapted to fit snugly around the inner receptacle 16 and when closed with fastening means 42 to press the heater 20 and the heater 54 firmly against the outer covering of the inner receptacle 16.

As shown in FIG. 1 the outer receptacle 12 is about 11 inches in length and has an opening with a diameter of three and three quarter inches. The distribution of the perforations 14 and the outer receptacle may be from three to ten per square inch.

Chemical type thermometers which indicate a temperature change in or illumination of a color dot are available on the market. One such example is an aquarium thermometer manufactured under the trade name TETRA NAUTILUS. Thermometers of this type are available which provide a temperature range of from 30 degrees C to 150 degrees C.

The preferred thermometer 22 is what is described in the art as a liquid crystal indicator slip. The liquid crystal temperature indicator is comprised of thermal thermochromic liquid crystals.

There is shown in FIG. 2 a front view of the container 10. Shown in greater detail attached to the front of the container 10 is the thermometer 22 or liquid indicator slip showing a temperature range from 20 degrees C to 140 degrees C. There the outer receptacle 12 is shown adapted with a second seam 41. The second seam 41 is adapted with a second fastening means 43 for providing reclosability, namely, a hook and loop fastener, for example. Seam 41 extends the length of the outer receptacle 12 and ends at a point 45 near the bottom of the container 10. An additional rivet 37 is used on the left front side of the container 10 to form the inner receptacle 16. Perforations 14 extend throughout the front surface of the outer receptacle 12.

There is shown in FIG. 3 a left side view of the container 10. There are no perforations on the rear or proximal side 48 of the container 10. The perforations 14 are located entirely on the front or distal side 46 of the container 10. The rivet 37 is shown extending through the upper portion of the container 10 and closing the left side of the inner receptacle 12. The outer receptacle 16 is permitted to "breath" thru its proximal side 48, that is, allow air to flow from the outside to the inside and vice versa via the perforations 14.

There is shown in FIG. 4 a right side view of the container 10 shown in FIG. 1. The arc welding rods 38 are not shown and have been removed in FIG. 4 for illustrative purposes. Again, note that the proximal side 48 of the container 10 is devoid of perforations such as the perforations 14 on the ventral side 46 of the container 10. The proximal side of container 10 rests adjacent clothing of the welder 26 wearing the container 10 and must insulate the welder 26 from the heater 54.

There is shown in FIG. 5 a cross section of the container 10 taken along a plane intersecting the line 5—5' in FIG. 2. For purposes of illustration several of the arc welding rods 38 are shown occupying inner receptacle 16 of the container 10. The outer receptacle 12 is shown further occupied by heaters 20 and 54 such as, for example, GRABBERS TM as previously described herein.

In FIG. 6 there is shown a partial cross section of the container 10 shown in FIG. 2 taken along a plane intersecting the line 6—6'. The cross section shown in FIG. 6 for illustrated purposes only shows a portion of the plurality of welding rods 38 within the inner receptacle 12. Within the outer receptacle 16 is shown the heater 20 occupying the plenum 56 established by the space between the exterior of the inner receptacle 12 and the interior of the outer receptacle 16.

The novel method of using the container 10 for maintaining arc welding rods such as the arc welding rods 38 shown in FIG. 1 at a required pre-use temperature is illustrated in FIG. 7. There is shown a first step 70 which comprises drying each arc welding rod such as, for example, E7018 rods at a temperature for two hours by placing them in a drying oven at 245 degrees C plus or minus 15 degrees.

The next step 72 is to warm the container 10 shown in FIG. 1 by inserting warmers or heaters 20 and 54 as shown in FIG. 5 into plenums between the inner receptacle 12 and the outer receptacle 16 allowing these heaters to heat up the container 10 such that the thermometer 22 shown in FIG. 2 on the front of the container 10 registers a surface temperature which has been precalibrated to match a temperature inside the empty inner receptacle 12 of at least 28 degrees C $T_1$ but not more than 140 degrees C or $T_2$.

The next step 74 is to place a plurality of the rods, for example, E7018 rods into the novel container 10 shown in FIG. 1 with the coated ends of the rods placed at the bottom of the inner receptacle 12 and the uncoated base of the rods 38 protruding out of the top of the inner receptacle 12. Once the temperature inside the inner receptacle 12 is determined to be between approximately 30 degrees C and 140 degrees C then the prewarmed arc welding electrodes 38 are inserted into the container 10 and removed as needed.

The next step 76 is to transport the container 10 or pouch to a welding job site. Periodically, the welder 26 observes the thermometer 22 on the container 10 to insure that the temperature indicator for the thermometer 22 shows the temperature inside the inner container 12 to be between about 28 degrees C and 139 degrees C. If the temperature range indicates that it may fall below the 30 degree C level and a new heater 20 is inserted into the plenum 56. This step 78 maintains the container 10 within the temperature range from $T_1$ to $T_2$. The next step 80 is for the thermometer 22 to indicate the temperature as T of the container 10.

On step 82 an electrode 38 is removed provided the temperature T indicated by the thermometer 22 is between $T_1$ and $T_2$. More specifically, step 82 involves a determination that the temperature indicated by the thermometer 22 is less than or equal to $T_2$ or approximately 139 degrees C and greater than or equal $T_1$ or approximately 28 C degrees. If the thermometer 22 as indicated in step 82 in FIG. 7 is within this range from $T_1$ to $T_2$ then a welding electrode 38 is withdrawn by the welder from the container 10 and the welder commences welding with the rod withdrawn executing step 84.

What is claimed is:

1. A container for an arc welding electrode comprising a transportable pouch, said pouch having a closed bottom and an open top, said pouch receiving said electrode through said open top, and chemical heating means maintaining said electrode within a range of temperature between about 28 degrees C and about 139 degrees C located inside said container.

2. A container for maintaining a preheated welding electrode having an uncoated end and a coated end comprising a chemical heater, said container having an inner cavity and an outer cavity, said outer cavity being located adjacent said inner cavity, said chemical heater being replaceably located inside said outer cavity, said outer cavity having a closed bottom, said inner cavity having a closed bottom and an open top through which inverted electrodes are inserted and withdrawn, said inner cavity being elongated and sized to cover the coated end of a welding electrode, said outer cavity having an outer wall and an inner wall, said outer wall having means opening and reclosing said outer wall and means indicating an approximate temperature inside said container whereby the preheated welding electrode is maintained within a temperature range between about 28 degrees C and about 139 degrees C above ambient temperature.

3. The container of claim 2 wherein said chemical heater is located in an air-tight envelope sealingly encapsulating said chemical heater at any non-heat generating time period, said chemical heater adapted to produce an elevated temperature, said chemical heater comprising means enclosing an exothermic composition, said enclosing means disposed within said air-tight envelope whereby upon opening of said air-tight envelope heat is produced which elevates the temperature inside said container to said range for a substantial time period.

4. The container of claim 3 further comprising perforations in the inner wall, said chemical heater being further disposed in between said inner wall and said outer wall, said inner cavity adapted to hold a plurality of said coated welding electrodes, said perforations adapted to allow convective transfer of heat from said outer cavity therethrough to said inner cavity whereby said coated electrodes are maintained within said temperature range while inside said container.

5. A method for maintaining at a preheated temperature a coated welding electrode removably contained in a pouch attached to a welder and carried by the welder comprising the steps of: Providing a belt adjacent a waist of the welder; providing means attaching said pouch to said belt; providing said pouch with an inner cavity and an outer cavity; convectively connecting said inner and outer cavities by perforations; placing at least one exothermic chemical heater in said outer cavity; activating an exothermic chemical heater in said outer cavity; inserting a preheated coated electrode in said pouch; transporting said coated welding electrode in said pouch to a welding site; observing a temperature indicator attached to said pouch; determining that the temperature indication of said temperature indicator indicates a temperature within a range between about 28 degrees C and about 139 degrees C prior to removing said electrode; removing said electrode from said pouch; and then immediately using said electrode.

* * * * *